Feb. 13, 1934.    W. J. MORRILL    1,947,163
ONE POLE MOTOR
Filed Aug. 31, 1933    2 Sheets-Sheet 1
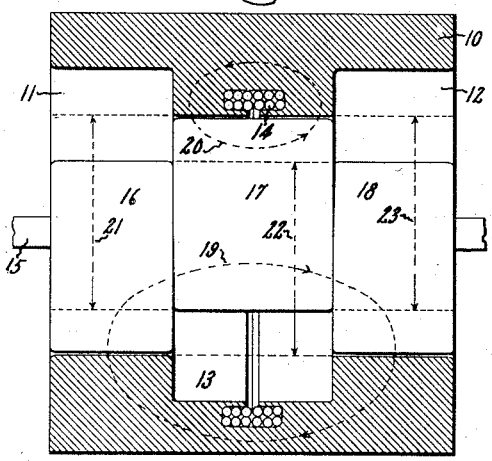
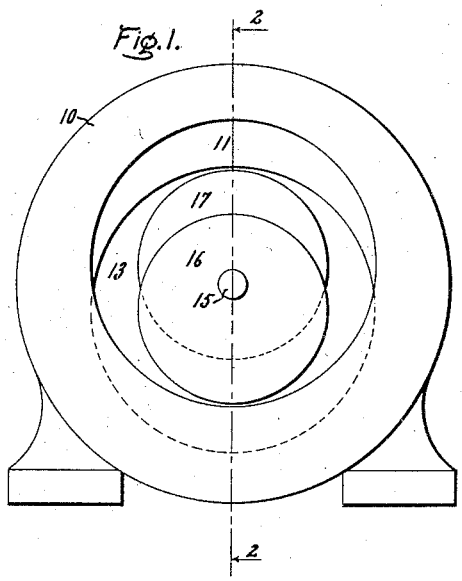
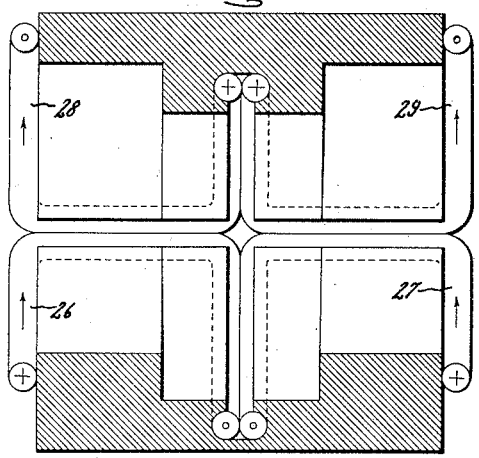
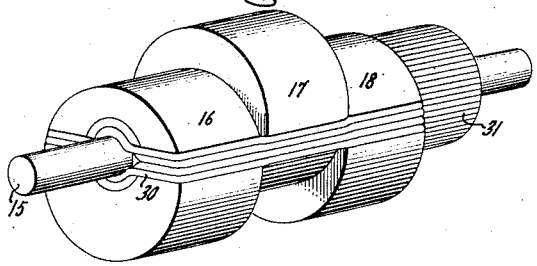
Inventor:
Wayne J. Morrill,
by Harry E. Dunbar.
His Attorney.

Feb. 13, 1934.  W. J. MORRILL  1,947,163
ONE POLE MOTOR
Filed Aug. 31, 1933  2 Sheets-Sheet 2

Inventor:
Wayne J. Morrill,
by Harry E. Dunham
His Attorney.

Patented Feb. 13, 1934

1,947,163

UNITED STATES PATENT OFFICE 1,947,163

ONE POLE MOTOR

Wayne J. Morrill, Fort Wayne, Ind., assignor to General Electric Company, a corporation of New York Application August 31, 1933. Serial No. 687,612

11 Claims. (Cl. 172—275)

My invention relates to alternating current motors for high speed operation. In particular, my invention relates to a one pole synchronous motor having a speed double that of a two pole motor of the same supply frequency. Another feature of the invention is the provision of means for starting the motor and bringing it up to the high speed at which it is intended to run. The invention is useful for various purposes where a high speed motor drive is desired for one reason or another. A vacuum cleaner is an example of an application where my invention is particularly useful.

It has been the general impression that a two pole motor will run at the highest speed which it is practicable to obtain with a constant speed alternating current motor. This, however, is not the case since my invention of a practicable one pole motor makes it possible to obtain twice the speed of the usual two pole motor. In carrying my invention into effect, I provide relatively rotatable stator and rotor members with the magnetic material of the adjacent peripheral surfaces defining the air gap so shaped and disposed that the rotor approaches closest to the stator at only one point in its rotation. If a sinusoidal alternating flux is endeavoring to pass between rotor and stator, the permeance will be highest when the stator and rotor are closest together and at all other points the permeance will be less. The variation of permeance is made substantially sinusoidal with respect to the rotation of the rotor and a stator winding is provided to produce a substantially sinusoidal alternating flux between stator and rotor. This means that for each half cycle the flux will increase to a maximum and decrease to zero and will produce a synchronous rotor torque at a speed where the rotor revolves one revolution per half cycle. The disposition of the magnetic material is made such as to produce a balanced rotor both magnetically and mechanically. Suitable means are preferably provided on the rotor itself to start the same and bring it up to the synchronous speed. For this purpose the stator winding may be reconnected to produce a two pole flux through the rotor and the latter may be provided with a commutated winding for connection in series with the stator winding for starting purposes.

Figure 5:
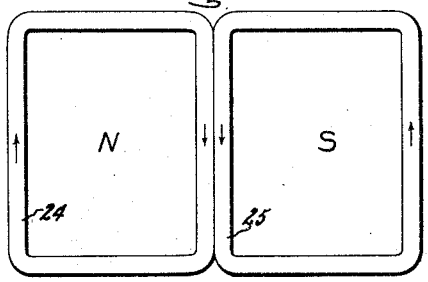
Figure 6:
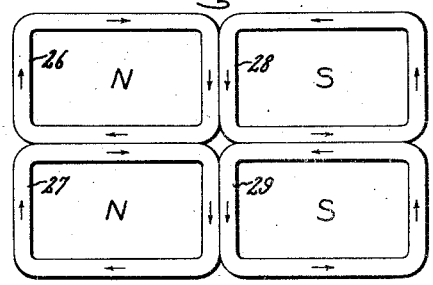
Figure 7:
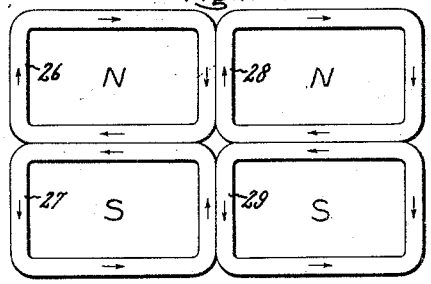
Figure 8:
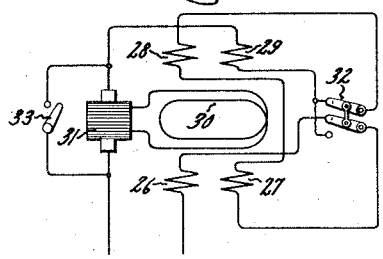
Figure 9:
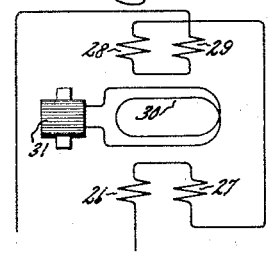
Figure 10:
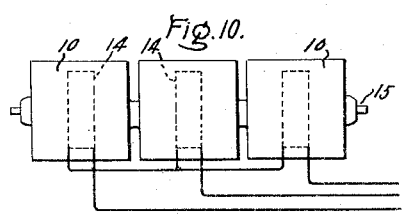

The features of my invention which are believed to be novel and patentable will be pointed out in the claims appended hereto. For a better understanding of my invention reference is made in the following description to the accompanying drawings, in which Fig. 1 represents an end view and Fig. 2 a sectional side view taken on line 2—2 of Fig. 1 of a one pole motor embodying my invention. Fig. 3 represents a sectional view through a stator element showing an arrangement of the winding which may be connected for one pole operation or reconnected to produce a two pole flux for starting purposes. Fig. 4 represents a perspective view of a rotor having its magnetic material disposed as in Figs. 1 and 2 and being also provided with a commutated winding which rotor may be used with the stator of Fig. 3 to provide a 2 pole series commutator connection for starting purposes. Figs. 5, 6, and 7 are figures which will be referred to in explaining the winding found on the stator of Fig. 3; Fig. 8 represents the starting connection of a motor provided with the starting facilities of Figs. 3 and 4; Fig. 9 represents the one pole running connection of such a motor, and Fig. 10 represents a three phase motor combination employing my invention.

Referring particularly to Figs. 1 and 2, it will be observed that the stator of the motor is a piece of magnetic material 10 in the general shape of a hollow cylinder, the inner portion of which is cut out in three sections forming an opening with three circular peripheries which are offset or eccentric with respect to the central axis. The circular opening sections 11 and 12 at the ends are in axial alignment and eccentric with respect to the central axis in one direction while the inner circular opening section 13 is eccentric or offset from the central axis in the opposite direction at 180 degrees from the end sections. The cutout portions overlap leaving an irregular shaped opening for the rotor through the stator structure. The central section 13 of the stator is about twice as wide as the end sections for reasons that will presently appear and the stator is provided with a winding 14 which surrounds the central portion and which when energized with alternating current produces an alternating flux through the axis of the machine.

The rotor for this machine is in the general shape of a solid cylinder and is mounted on a central shaft 15 and is divided into three circular magnetic sections 16, 17, and 18, all of which are eccentrically mounted with respect to the shaft 15. The end sections 16 and 18 of the rotor are in axial alignment and are of substantially the same length as the end opening sections of the stator to which they are opposite and are offset from the central axis and shaft in a direction which is opposite to the direction of offset or eccentricity of the central rotor section 17 which corresponds in length to the central cutout section of the stator. The inner peripheral surface of the stator is of larger diameter than that of the rotor but otherwise conforms to the shape of the rotor surface. The two are mounted in telescoping inductive relation with their axes parallel to the axis of rotation.

In the position of the rotor shown in Figs. 1 and 2, it will be observed that each of the rotor sections approaches closely to that portion of the adjacent stator iron section which is nearest the central axis. Thus rotor section 16 approaches very close to the innermost portion of the stator formed by the cutout section 11 at the point where this stator section approaches nearest the central axis and shaft 15. A similar condition exists between the other end section 18 and its adjacent stator portion. Likewise the central rotor section 17 approaches close to the central stator section at the point where it is nearest the central shaft, but these points of minimum air gap are 180 degrees apart in the central and end portions. In this position of the rotor there exists fairly low reluctance paths for any axial flux produced by winding 14, these paths being indicated by the dotted lines 19 and 20 in Fig. 2. If now the rotor be rotated 180 degrees sections 16, 17, and 18 of the rotor will take the positions indicated in dotted lines 21, 22, and 23, (Fig. 2) respectively in which position each of the rotor sections will be in their maximum distance positions from their corresponding stator sections and the flux paths between stator and rotor will have a maximum reluctance. Thus it will be observed that the adjacent peripheral surfaces of stator and rotor are so shaped and disposed with respect to the axis of rotation that as the rotor is rotated it has minimum and maximum reluctance positions with respect to the stator once in each revolution, and the minimum reluctance position is 180 degrees from the maximum reluctance position. The magnetic material on both members is thus formed to provide a path for the axial flux that varies sinusoidally between a maximum and a minimum reluctance each revolution and it will be evident that if the stator winding is energized by alternating current and the rotor is rotating at or near a speed which is synchronous therewith, there will be a synchronizing torque which tends to bring the rotor in the position of minimum reluctance in synchronism with the half cycle flux pulsations. The motor may be called a one pole rotary reluctance motor. On a 60 cycle circuit, these flux pulsations will occur 120 times per second or 7200 times per minute and consequently this motor will have a basic synchronous speed of 7200 R. P. M. on 60 cycles. The motor may also be energized by regularly reoccurring direct current pulsations and the synchronous speed will be the same as the number of pulsations. It will of course be obvious that the primary here illustrated as the stator may rotate and the secondary here illustrated as the rotor may be stationary.

It would of course be possible to make this type of motor much simpler, for example, by using only the central sections of stator and rotor, if we ignored mechanical and magnetic balance. However, with very high speeds such as is contemplated balance of the rotor is of considerable importance. The form of motor shown in Figs. 1 and 2 is mechanically balanced as a unit in that the central section of the rotor is made sufficiently longer than the end sections that its centrifugal moment will exactly balance the opposite centrifugal moments of the end sections of the rotor. Another reason for making the middle section longer than the end sections is to substantially balance the flux on diametrically opposite sides of the rotor axis as it will be noted that the flux in traversing its magnetic circuit must both enter and leave the rotor in the middle section whereas in the end sections it enters one and leaves the other. By giving the middle section of the rotor approximately the same length as the sum of lengths of the end sections, a one pole motor is obtained which is magnetically and mechanically balanced.

Any suitable means may be provided to bring such a motor up to approximately its synchronous speed where it will fall into step. However, I prefer the self-contained starting arrangement now to be described where the field winding of the stator is so arranged that it may be reconnected as a two pole starting winding and the rotor is provided with a commutated winding to enable the motor to be started as a two pole series motor.

The nature of the stator winding to serve the double purpose of starting and synchronous operation can be explained with the aid of Figs. 5, 6, and 7. In Fig. 5 I have represented a development of a simple two pole winding having opposite poles as indicated by "N" and "S" for the direction of current flow in the two coils 24 and 25 indicated by the arrows thereon. In Figures 5, 6, and 7 it will be helpful to note that the windings represented assume that the rotor axis of the motor is vertical instead of horizontal. The 2 pole developed winding result of Fig. 5 may be obtained by the use of 4 coils and a current flow according to the arrows represented in Fig. 6. Here coils 26 and 27 take the place of coil 24 of Fig. 5 and produce a N. pole, the currents in the adjacent coil sides being in opposite directions annul each other. Similarly coils 28 and 29 produce a S. pole and replace coil 25 of Fig. 5.

If, now, we reverse the direction of current flow in coils 27 and 28 of Fig. 6, we obtain the results pictured in Fig. 7 where it will be noted that the currents in the adjacent turns of coils 26 and 28 are opposite and annul each other, and the currents in the adjacent turns of coils 27 and 29 are opposite and annul each other giving an axial field flux of the character represented in Fig. 2 assuming the motor axis is vertical in Fig. 7. Thus I provide the stator of the motor with a four coil field winding connected to produce the normal 2 pole field pictured in Fig. 6 for starting purposes and connected to produce the axial flux field as pictured in Fig. 7 for synchronous operation.

Fig. 3 represents a section through a stator with the coil arrangement of Figs. 6 and 7 provided thereon and connected to produce the axial flux for synchronous operation as represented in Fig. 7. Only ½ of each coil is represented in Fig. 3 because this is a half sectional view of the stator. It will be evident that by reversing the current in coils 27 and 28 of Fig. 3 we will obtain a normal 2 pole flux such as is represented in Fig. 6.

Fig. 4 represents a rotor having its magnetic material arranged as in Figs. 1 and 2 and having an armature winding represented at 30 connected to a commutator represented at 31. The rotor of Fig. 4 and the stator of Fig. 3 thus provide a one pole motor in general such as has been explained in connection with Figs. 1 and 2 but which motor may have its stator coils connected for 2 pole operation and in series with a commutated winding on the rotor for starting purposes.

The starting connections of such a motor are represented in Fig. 8. A switch 32 is provided for reversing coils 27 and 28 and a switch 33 is provided for short circuiting the commutator. As is well known, a series motor will reach very high speeds if unloaded and the arrangement described provides a simple way of bringing the motor of my invention up to the one pole synchronous speed. When this speed is reached the connections are changed to those represented in Fig. 9, the rotor pulls into synchronism if it has not already done so and thereafter will operate at a one pole synchronous speed. The change in connections between starting and running condition may be accomplished automatically by one of the well known forms of speed responsive devices.

In the foregoing description and in the illustrations I have not attempted to point out or show exact dimensions or details of mechanical construction which may be desirable to follow in building such a motor. For example, it may be desirable to have a little clearance between the different rotor sections to allow for end play without having one rotor section rub against an axially displaced stator part in certain rotary positions and the commutated winding should be sufficiently embedded in the rotor iron at the ends of the different offset rotor sections to prevent damage thereto in certain positions if end play is present. Three such motors, such as is shown in Figs. 1 and 2, may have their rotors mounted on the same shaft and have their minimum reluctance positions angularly displaced 120 degrees and be energized from a three phase source of supply as represented in Fig. 10, producing in effect a three pole, three phase motor combination having the speed of the one pole motor hereinbefore described but having three uniformly spaced torque pulsations per revolution. Other advantageous polyphase combinations of the invention will readily occur to those skilled in the art.

Having described the essential features of my invention in its preferred embodiments, I seek claims commensurate with the true spirit and scope thereof.

What I claim as new and desire to secure by Letters Patent of the United States is:

1. A one pole reluctance motor comprising relatively rotatable primary and secondary elements, said elements being composed of magnetic material, and one element surrounding the other in telescoping relation parallel to the axis of rotation, a winding on the primary member for producing a flux which links the primary and secondary elements in an axial direction, the relatively rotatable adjacent peripheral surfaces of said members being so shaped and disposed with respect to the axis of rotation that the reluctance of the flux path between primary and secondary varies between maximum and minimum values only once per revolution and means for exciting said winding with regularly recurring current pulsations.

2. A one pole synchronous reluctance motor comprising relatively rotatable members each composed of magnetic material and disposed in telescoping inductive relation one within the other parallel to the axis of rotation, a winding on the outer member for producing a pulsating axial flux linking both members, the adjacent inner and outer peripheries of the outer and inner magnetic members being so shaped and so disposed with respect to the axis of rotation that, as relative rotation takes place, the magnetic reluctance between said members in the path of the pulsating axial flux varies between maximum and minimum values substantially sinusoidally only once per revolution.

3. A one pole synchronous reluctance motor comprising a stationary primary member of magnetic material in the general shape of a hollow cylinder and a secondary member of magnetic material in the general shape of a solid cylinder rotatably mounted within the primary member on an axis which is parallel to the axis of the said members, an energizing winding on the primary member for producing an alternating flux threading both members in axial directions, the shapes of the adjacent peripheral surfaces of the members and their locations with respect to the axis of rotation being such that as the rotor turns the reluctance of the path of the flux produced by the energizing winding varies substantially sinusoidally between minimum and maximum values once for each complete revolution of the rotor.

4. A one pole synchronous reluctance motor comprising a stationary primary member and a rotary secondary member, an energizing winding on the primary member, magnetic material on both members formed to provide a path for the flux produced by the said energizing winding which path varies in reluctance between a maximum and a minimum value in substantially a sinusoidal relation as the rotor makes a complete revolution, and the magnetic material on the two members being further so formed and positioned with respect to the axis of rotation as to maintain the rotor substantially magnetically and mechanically balanced as it revolves.

5. A one pole synchronous reluctance motor comprising a stationary member and a rotary member, an energizing winding on one of said members, magnetic material on both members so disposed as to form a pair of parallel paths for the flux produced by said energizing winding which paths are of substantially equal reluctance at any instant and are on diametrically opposite sides of the axis of rotation and simultaneously vary in reluctance between maximum and minimum values once for each complete revolution of the rotor, the magnetic material on said rotor being further so disposed thereon as to be substantially mechanically balanced with respect to the axis of rotation.

6. A one pole synchronous reluctance motor comprising a rotor member formed of three cylindrically shaped magnetic parts mounted end to end on a shaft, the two end cylindrical parts being in axial alignment and of less length than the intermediate cylindrical part and eccentrically mounted in one direction with respect to the shaft, the intermediate cylindrical part being eccentrically mounted with respect to the shaft in the opposite direction to produce a substantially centrifugally balanced structure, a stator member formed of magnetic material and having a sectionalized axial opening which is of larger diameter but which is otherwise of the same outline and axial dimensions of the above described rotor, and in which the rotor is centrally located, and a winding on the stator for producing a pulsating axial flux through said stator and rotor which flux is substantially equally balanced on opposite sides of the axis of rotation.

7. A one pole synchronous reluctance motor having stator and rotor members, a primary winding on one member for producing a pulsating flux parallel to the axis of rotation of the motor in the stator and rotor members, the stator and rotor members having magnetic circuits in the path of this flux so disposed as to substantially sinusodially vary the reluctance of this flux path between stator and rotor between maximum and minimum values once for each revolution of the rotor and to maintain the flux distribution substantially balanced with respect to the axis of rotation of the motor during synchronous operation thereof, and means on said motor for electrically starting the same and bringing the speed thereof up to approximately its synchronous speed.

8. A one pole synchronous reluctance motor having stator and rotor members, a winding on one of said members for producing a pulsating flux in both members parallel to the axis of rotation thereof, magnetic material on both members so disposed as to produce a substantially sinusoidal variation in the reluctance between stator and rotor members in the path of said flux once for each complete revolution of the rotor while maintaining the motor in magnetic and mechanical balance with respect to the axis of rotation thereof, means for reconnecting the aforesaid winding to produce a two pole field for said motor for starting purposes and a starting winding on the other of said members responsive to such two pole field.

9. A one pole synchronous reluctance motor comprising stator and rotor members, a winding on the stator member for producing a pulsating flux field parallel to the axis of rotation of said motor through stator and rotor members for synchronous operation, magnetic material on stator and rotor members so disposed in the above-mentioned field as to vary the reluctance of the flux path between stator and rotor members between maximum and minimum values in a substantially sinusoidal relation once for each complete revolution of the rotor and to maintain the flux distribution substantially balanced and the rotor substantially mechanically balanced with respect to the axis of rotation as the rotor revolves at synchronous speed, a commutated winding on the rotor member and means for reconnecting the first-mentioned winding to produce a normal two pole field for the motor and for connecting the commutated winding in series therewith for starting purposes.

10. A single phase, one pole, synchronous, reluctance motor element comprising stator and rotor members, a single phase winding on one member for producing an alternating flux through both members in the axial direction of said motor, magnetic material on both members so disposed in the path of the alternating flux as to vary the reluctance of such path between maximum and minimum values once for each complete revolution of the rotor whereby the latter will seek the rotative position of minimum reluctance as the flux reaches a maximum in either direction and operate synchronously at a speed equal to the number of flux pulsations or half cycles, the magnetic material on said rotor being substantially centrifugally balanced with respect to the axis of rotation and the magnetic material on both members being disposed to substantially equalize the flux between stator and rotor elements on diametrically opposite sides of the axis of rotation.

11. In combination with a polyphase source of supply, a polyphase electric motor combination consisting of a number of one pole single phase motor elements equal in number to the number of phases and each having stator and rotor members, an energizing winding on each motor element, the windings on the different motor elements being energized from different phases of said source to produce axial fluxes through the stator and rotor members of the respective motor elements, magnetic material on the stator and rotor members of each motor element so disposed as to produce paths for the axial flux thereof which varies in reluctance between maximum and minimum values once for each revolution, the rotors of the different motor elements being mounted on the same shaft with their positions of minimum reluctance angularly displaced by the same angle as the electrical angle between the phases of the polyphase source.

WAYNE J. MORRILL.